Oct. 3, 1950     R. D. SMITH     2,524,576
SUPPORTING STRUCTURE FOR THE SUPPORTING
ASSEMBLY OF MOTOR VEHICLES
Filed Aug. 17, 1945     2 Sheets-Sheet 1
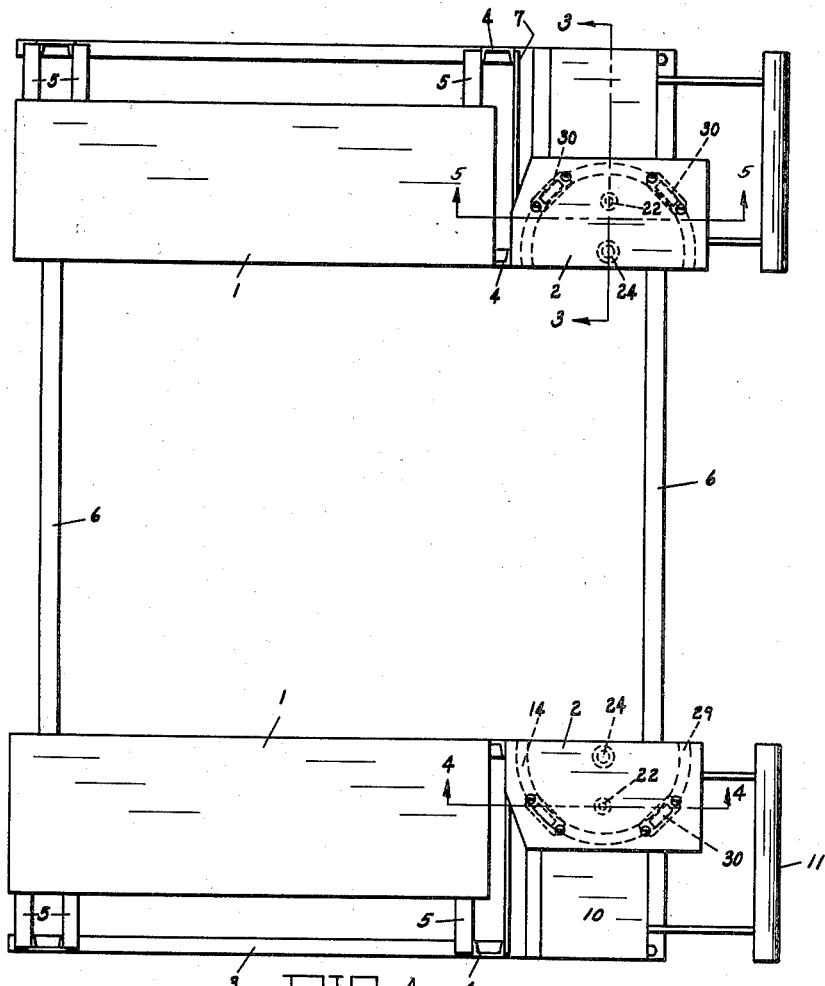
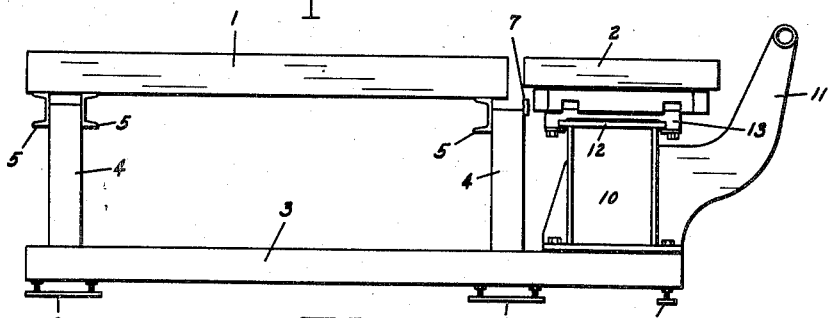
INVENTOR.
Roy D. Smith
BY Merrill M. Blackburn
Atty.

Oct. 3, 1950 R. D. SMITH 2,524,576
SUPPORTING STRUCTURE FOR THE SUPPORTING
ASSEMBLY OF MOTOR VEHICLES
Filed Aug. 17, 1945 2 Sheets-Sheet 2

INVENTOR.
Roy D. Smith
BY Merrill M. Blackburn
ATTY.

Patented Oct. 3, 1950

2,524,576

UNITED STATES PATENT OFFICE 2,524,576

SUPPORTING STRUCTURE FOR THE SUPPORTING ASSEMBLY OF MOTOR VEHICLES

Roy D. Smith, Mertzon, Tex., assignor to Bee-Line Company, Scott County, Iowa, a copartnership Application August 17, 1945, Serial No. 611,023

1 Claim. (Cl. 33—203.12)

The present invention relates, in general, to the art of checking the steering assembly of a motor vehicle and more particularly to the mechanism for so supporting the front wheels of such a vehicle that the friction, when turning the wheels, will be reduced to a minimum.

Among the objects of this invention are to provide a structure which is, in general, improved over prior structures; to provide a structure of the type indicated in which the necessary movement of parts is held to a minimum; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 shows a plan view of a structure embodying my present invention;

Fig. 2 represents a side elevation of the structure shown in Fig. 1;

Figures 3, 4:
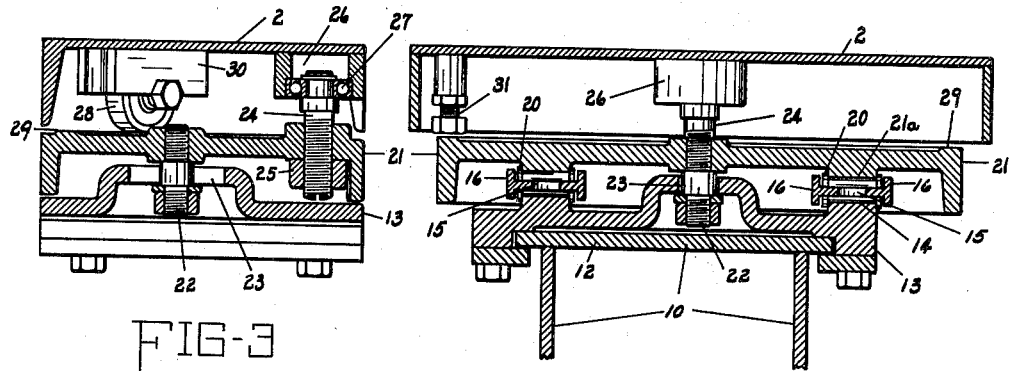
Fig. 3 represents a cross-section substantially along the plane indicated by the line 3—3, Fig. 1.
Fig. 4 represents a longitudinal section approximately along the plane indicated by the line 4—4, Fig. 1.

While the present structure may be used on a flat floor in conjunction with elongated elevated runways, such as are commonly used in connection with motor vehicle frame-correction apparatus, I have illustrated an apparatus for use in a pit with the tops of the runway sections in the same plane as the adjacent floor. It will therefore be understood that the structure claimed may be used equally as well with either type of approach.

Reference will now be made in greater detail to the annexed drawings for a more complete description of this invention. As has been indicated, the approaches 1 leading to the turntables 2 are supported, according to the present disclosure, at substantially floor level. The supporting structure comprises side rails 3, posts 4, crossbars 5, and connecting members 6 for connecting the two sides of the structure. A crossbar 7 is used, in addition to one of the crossbars 5, to connect the forward posts 4 of each of the side units. Adjustable means 8 and 9 are used for leveling up this supporting framework and the structures carried thereby.

Figures 5, 6:
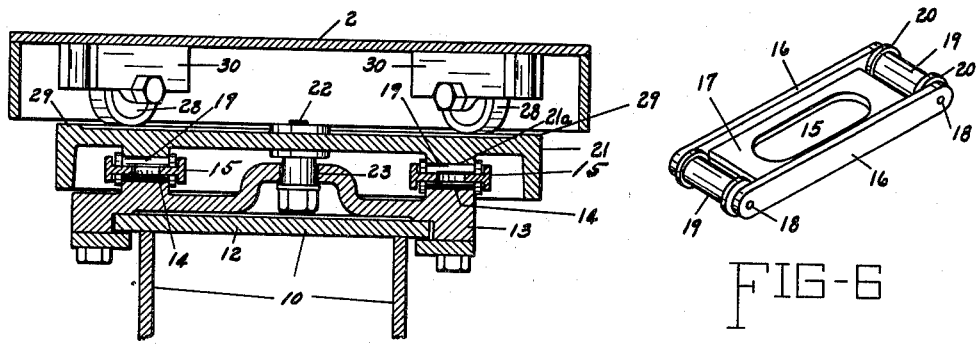
Fig. 5 represents a longitudinal section approximately along the plane indicated by the line 5—5, Fig. 1.
Fig. 6 represents an isometric view of a supporting unit shown in end elevation in Figs. 4 and 5.

At the forward end of each unit is a supporting box 10 to which is connected a bumper 11, projecting upwardly into the path of the forward wheels of a motor vehicle to keep the same from inadvertently running off the front end of the supporting mechanism. On the top 12 of each box 10 is a plate 13 provided on its upper surface with tracks 14, along which are guided a pair of carriers 15. The forward and rearward edges of the plate 13 extend downwardly overlapping the edges of the top 12. These downward projections have retainers extending inwardly under the top 12 to prevent inadvertent detachment of the supported structure from the top 12. As indicated in Fig. 6, these carriers comprise webs 17 having connecting links 16 connected thereto. At each end of each carrier is a pivot pin 18 which passes through a roller 19 provided at each end with a flange 20, the purpose of which is to prevent the carriers 15 from leaving track 14. The flanges 20 may, if desired, be washers having a larger diameter than the rollers 19.

The plate 21, provided with downwardly extending tracks 21a, is supported on the carriers 15 and is connected to the plate 13 by a holding member 22. The holding members 22 permit the plates 21 to slide in a horizontal direction, supported by the carriers 15. Slots 23 in the plates 13, through which the members 22 pass, permit sidewise shifting, relatively to each other, of the plates 13 and 21. The purpose of this sidewise shifting is to accommodate vehicles having different widths of tread.

For permitting rotational movement of the turntables 2, there are provided pivot bolts 24 which are adjustably mounted in the plates 21 and are secured in adjusted position by means of lock nuts 25. On the under side of each turntable 2 is provided a receptacle 26 in which is mounted a bearing 27 which surrounds the pivot 24 and permits easy turning of the turntables 2 about the pivot. This easy turning of the turntables 2 is enhanced by the wheels 28 rolling on the tracks 29 on the upper surfaces of the plates 21. The wheels are mounted in boxes 30 on the under side of the turntables. Adjustable stops 31 are located under opposite ends of the turntables 2 and normally just clear the track 29. However, if the vehicle wheel is not approximately centered, longitudinally of the turntable, one end of the turntable may sag, permitting the stop member 31 to engage the track 29.

From the foregoing, taken in conjunction with the attached drawings, it is clear that there may be a limited amount of lateral adjustment of the turntables 2 from the position for the narrowest tread, as shown in Fig. 1, to a considerably wider position, merely by moving the superstructures laterally on the tracks 14, sliding the holding members 22 in the slots 23. It is also clear that these turntables may be adjusted laterally, individually, to bring the pivots 24 into alignment with the front wheels of the vehicle being tested. Furthermore, the wheels may be run upon the turntables until they are substantially precisely over the pivot 24. Therefore, as the steering wheel is turned to turn the vehicle wheels to the right or left, the friction of turning will be reduced to a minimum by the wheels 28 and the tracks 29. Since the apparatus for checking the front end geometry of a motor vehicle is separate from the apparatus here illustrated, it will not be here described.

It will of course be understood that the specific description of structure set forth above may be departed from without departing from the spirit of this invention as set forth herein and in the appended claims.

Having now described my invention, I claim:

In a support for the purpose stated, a framework, a plate thereon, said plate having a generally centrally located transverse slot for the reception of a connecting member and laterally arranged trackways substantially parallel to the length of the slot in the plate, a second plate having connecting means extending through and slidable in the slot in the first plate, carriers between the first and second plates rollable on the trackways for supporting and guiding the second plate, said second plate having on its upper surface an arcuate trackway, and a third plate having adjacent one edge a pivot means connecting it to an edge portion of the second plate, said third plate having rollable supporting means on its under surface riding on said arcuate trackway and stops for limiting the amount of tilting which the third plate may do.

ROY D. SMITH.

REFERENCES CITED

The following references are of record in the file of this patent:

UNITED STATES PATENTS

| Number | Name | Date |
|---|---|---|
| 332,577 | Whitlock | Dec. 15, 1885 |
| 555,346 | Stuckstede | Feb. 25, 1896 |
| 1,927,488 | Christensen et al. | Sept. 19, 1933 |
| 1,968,672 | Duby | July 31, 1934 |
| 1,987,098 | Creagmile | Jan. 8, 1935 |
| 2,020,613 | Miller | Nov. 12, 1935 |
| 2,087,909 | Haucke | July 27, 1937 |
| 2,135,195 | Morse et al. | Nov. 1, 1938 |
| 2,137,949 | Phelps | Nov. 22, 1938 |
| 2,155,541 | Graham et al. | Apr. 25, 1939 |
| 2,167,361 | Haucke | July 25, 1939 |
| 2,266,224 | MacMillan | Dec. 16, 1941 |